United States Patent [19]

Simon et al.

[11] Patent Number: 5,937,065

[45] Date of Patent: Aug. 10, 1999

[54] KEYLESS MOTOR VEHICLE ENTRY AND IGNITION SYSTEM

[75] Inventors: Marc R. Simon, Whitefish Bay; Charles J. Luebke, Sussex, both of Wis.

[73] Assignee: Eaton Corporation, Cleveland, Ohio

[21] Appl. No.: 08/831,711

[22] Filed: Apr. 7, 1997

[51] Int. Cl.[6] .................................................. H04C 9/00
[52] U.S. Cl. .................................................. 380/9; 380/25
[58] Field of Search .............................. 380/9, 25; 70/278

[56] References Cited

U.S. PATENT DOCUMENTS

| Re. 30,686 | 7/1981 | Bucher | 290/38 |
|---|---|---|---|
| 2,679,601 | 5/1954 | Hart | 307/10 |
| 4,674,454 | 6/1987 | Phairr | 123/179 |
| 4,688,036 | 8/1987 | Hirano et al. | 340/825.69 |
| 4,928,778 | 5/1990 | Tin | 180/167 |
| 5,000,139 | 3/1991 | Wong | 123/779 |
| 5,042,439 | 8/1991 | Tholl et al. | 123/179 |
| 5,054,569 | 10/1991 | Scott et al. | 180/167 |
| 5,612,578 | 3/1997 | Drew | 307/10.5 |
| 5,852,944 | 12/1998 | Collard, Jr. et al. | 70/278 |

OTHER PUBLICATIONS

Mehrdad Foroozesh, "Protecting Your Data With Cryptography," UNIX Review, Nov. 1996, v14, n12, p. 55(6).
"Specification sheet for HCS410 KeeLoq Code Hopping Encoder and Transponder," Microchip Technology Inc 1996.
"Specification sheet for HCS509 KeeLoq Code Hopping Decoder," Microchip Technology Inc 1996.

Primary Examiner—Salvatore Cangialosi
Attorney, Agent, or Firm—Quarles & Brady LLP

[57] ABSTRACT

A keyless control system is disclosed which may be employed to gain entry to a motor vehicle and start an engine. When using this system, a user activates a remote control by selecting a function for the motor vehicle to perform. In response, a challenge number is exchanged and used in an encryption algorithm by both the remote control and a control circuit in the motor vehicle to produce independently of each other separate algorithm answers. A first verification indication is produced when the control circuit finds both answers to be the same. The remote control also sends its unique remote control identification and a designation of the selected function to the control circuit. If the received remote control identification matches is on an authorized remote control list stored in the control circuit, a second verification indication is produced. When both the first and second verification indications are produced, the control circuit issues a signal that causes the motor vehicle to perform the selected function.

19 Claims, 3 Drawing Sheets

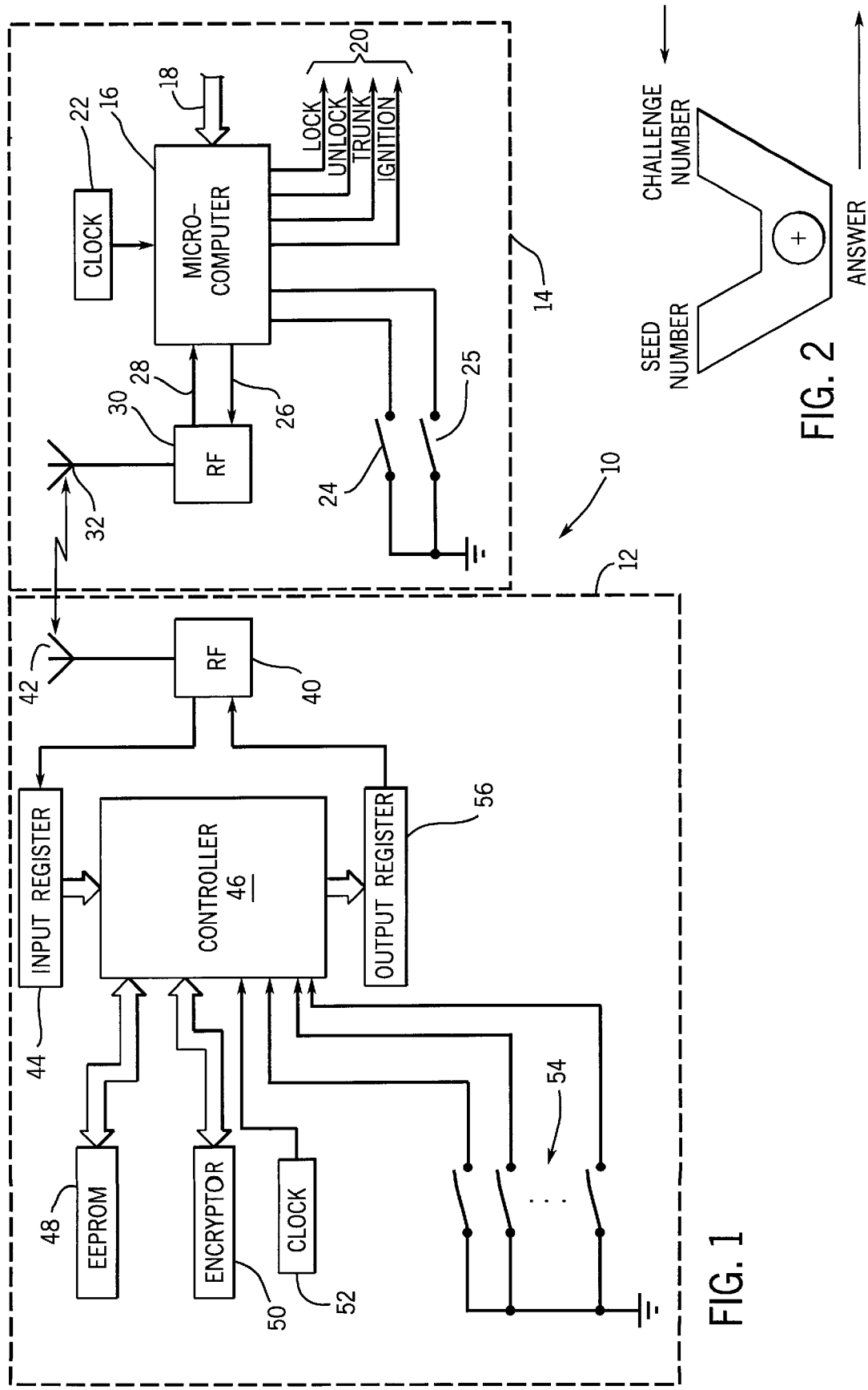

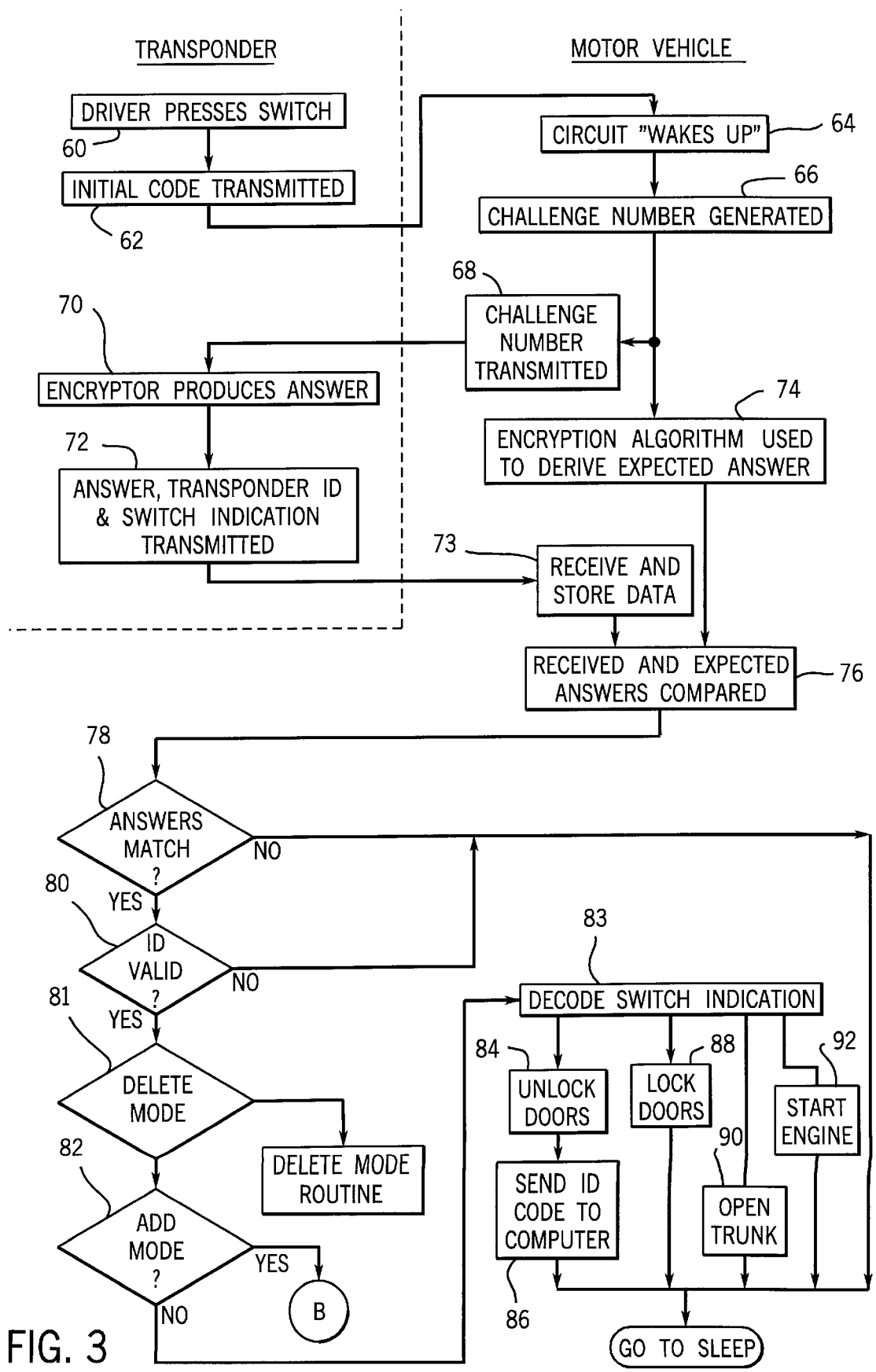

KEYLESS MOTOR VEHICLE ENTRY AND IGNITION SYSTEM

BACKGROUND OF THE INVENTION

The present invention relates to keyless systems for gaining entry and starting motor vehicles.

Automobiles traditionally were vulnerable to theft by a criminal forcibly removing the ignition lock cylinder thereby being able to start the vehicle without a key. With the advent of microprocessor based engine control systems came the ability to provide more sophisticated ignition control. Today many ignition keys have different types of electronic devices embedded in them which contain a special code for the key. When the key is inserted into the ignition lock, the vehicle reads the code from the key and the on-board computer system only responds to operation of the ignition switch by a properly encoded key. Thus the motor vehicle can not be started without that key, even if the ignition switch is turned somehow.

The advent of more sophisticated electronics in motor vehicle also has enabled remote keyless vehicle entry (RKE) systems to be provided to the driver. These commonly take the form of a fob which is attached to the driver's key ring. The fob houses a radio transmitter which sends a digital numerical value via a radio frequency (RF) signal to the vehicle when the driver pressing the appropriate switch on the fob. The digital numerical value prevents spurious radio frequencies from activating the motor vehicle circuitry, as well as making it difficult for unauthorized persons to gain access to the motor vehicle. The RF signal also encodes whether the user wishes the doors to be locked, unlocked or the trunk to be unlatched. A receiver mounted in the motor vehicle detects the transmission from the fob and decodes the RF signal to determine whether it is valid for that vehicle and which of the various functions is to be performed. The receiver then activates the appropriate components within the motor vehicle to perform that function.

Although the digital numerical value make it very difficult for unauthorized persons to gain access to the motor vehicle, concern has been expressed that some one with a radio receiver and a digital signal analyzer could eavesdrop on the radio transmissions and learn the security numbers. Thus a thief could "stake out" a valuable vehicle to await the return of the driver and learn the security numbers. Those security numbers then could be utilized to steal that vehicle at a later point in time.

To improve the security of remote keyless entry systems and deter eavesdropping, a "rolling code" security number is transmitted between the fob and the motor vehicle. In this technique both the motor vehicle and the fob were encoded with the identical initial security number during manufacture. Thereafter, each time a button on the fob was pressed, the previous security number is incremented by a value which is derived using a predefined algorithm. The resultant new security number then is transmitted to the motor vehicle and stored in the fob in place of the previous security number.

Upon receipt of a security number from the fob, circuitry in the motor vehicle retrieves the previously valid security number which it had stored. The motor vehicle circuitry then employs the same algorithm to increment the retrieved security number to produce its own new security number. In theory, both the fob and the motor vehicle should be synchronized so that their respective execution of the algorithm will produce identical new security numbers. Thus, a match between the security number received from the fob and new security number derived in the motor vehicle indicates a signal has been received from an authorized fob. This rolling code technique provides a greatly enhanced level of security and operates extremely well as long the security numbers in both the fob and the motor vehicle remain synchronized.

However, if a button on the fob is accidentally pressed when the motor vehicle is beyond the fob's transmission range, the rolling security number in the fob will be incremented without a corresponding incrementation of the security number in the motor vehicle. As a consequences, matches between the two codes will no longer occur and the authorized fob will not be recognized by the motor vehicle. One solution to this non-synchronization problem is for the motor vehicle to generate multiple subsequent security numbers using the rolling code algorithm and accept a fob signal as valid if any one of those subsequent security numbers matches the one received from the fob. However, this technique greatly reduces the number of possible security numbers since during each validation test the motor vehicle will accept multiple security numbers as being valid. Furthermore, the rolling code technique precludes the use of multiple authorized fobs for the same motor vehicle.

It is desirable to provide the remote keyless entry system with the ability to start the motor vehicle by adding another button to the fob. However, this latter function requires a higher level of security than that which is presently used to guard against unauthorized opening of the doors and trunk of the vehicle. In addition, the security provided for the ignition feature must also prevent an unauthorized person with the appropriate electronic equipment from being able to eavesdrop on the radio transmissions and learn the security numbers utilized to operate the vehicle.

Thus, it is desirable to provide a key fob with more activation features and a higher level of security.

SUMMARY OF THE INVENTION

A general object of the present invention is to provide a remote keyless vehicle activation system which has a high level of security for the transmitted signals.

Another object is to provide a means for encrypting the information being transmitted by the remote keyless system.

A further object of the present invention is to provide the rolling code security technique which still allows the use of multiple authorized fobs for the same motor vehicle.

Yet another object is to provide bi-directional data transmission between the motor vehicle and the keyless activating device to provide an enhanced level of security.

A still further object of the present invention is to utilize a bi-directional data transmission system to enable storage of ancillary data about the driver or the vehicle in the keyless activation device.

These and other objectives are satisfied by a keyless motor vehicle control system having a portable transponder by which a user selects a function to perform, and including a control circuit in the motor vehicle. The method of operation for the control system includes storing identical seed data and a transponder identification into the control circuit and the transponder.

When the user selects a function on the transponder, challenge data is exchanged between the control circuit and the portable transponder. Preferably the challenge data is randomly generated each time that its use is required. Then the control circuit executes an encryption algorithm which uses the seed data and the challenge data to produce a first answer. The transponder also executes the same encryption algorithm using the seed data and the challenge data, thereby producing a second answer which is transmitted to the control circuit. The transponder also transmits its transponder identification to the control circuit.

The control circuit compares the first and second answers and produces a first indication when a match occurs. The control circuit also determines whether the transponder identification received from the transponder matches a transponder identification that had been stored previously in the control circuit and if so, a second indication is produced. When both the first and second indications are produced, a control signal is generated for activating the motor vehicle function that was selected by the user.

This keyless vehicle control system implements a rolling code security system without requiring synchronized independent generation of the rolling code by both the transponder and the motor vehicle control circuit. A very large number of combinations can be utilized with a single combination assigned to a given motor vehicle and a unique transponder identification assigned to each transponder that is authorized to operate a given motor vehicle, thus providing extremely high probability against unauthorized activation.

Another aspect of the present invention allows transponder identifications to be added and deleted from storage in the control circuit. This functionality enables additional specific transponders to control functions on the same motor vehicle and enables a lost transponder to be prevented from controlling those functions.

BRIEF DESCRIPTION OF THE DRAWINGS

FIG. 1 is a block schematic diagram of a keyless motor vehicle control system according to the present invention;

FIG. 2 is a schematic representation of the process performed in the encryptor in FIG. 1;

FIG. 3 is a flowchart of the procedure for operating the motor vehicle which is performed by the keyless control system.

DETAILED DESCRIPTION OF THE INVENTION

Figure 4:
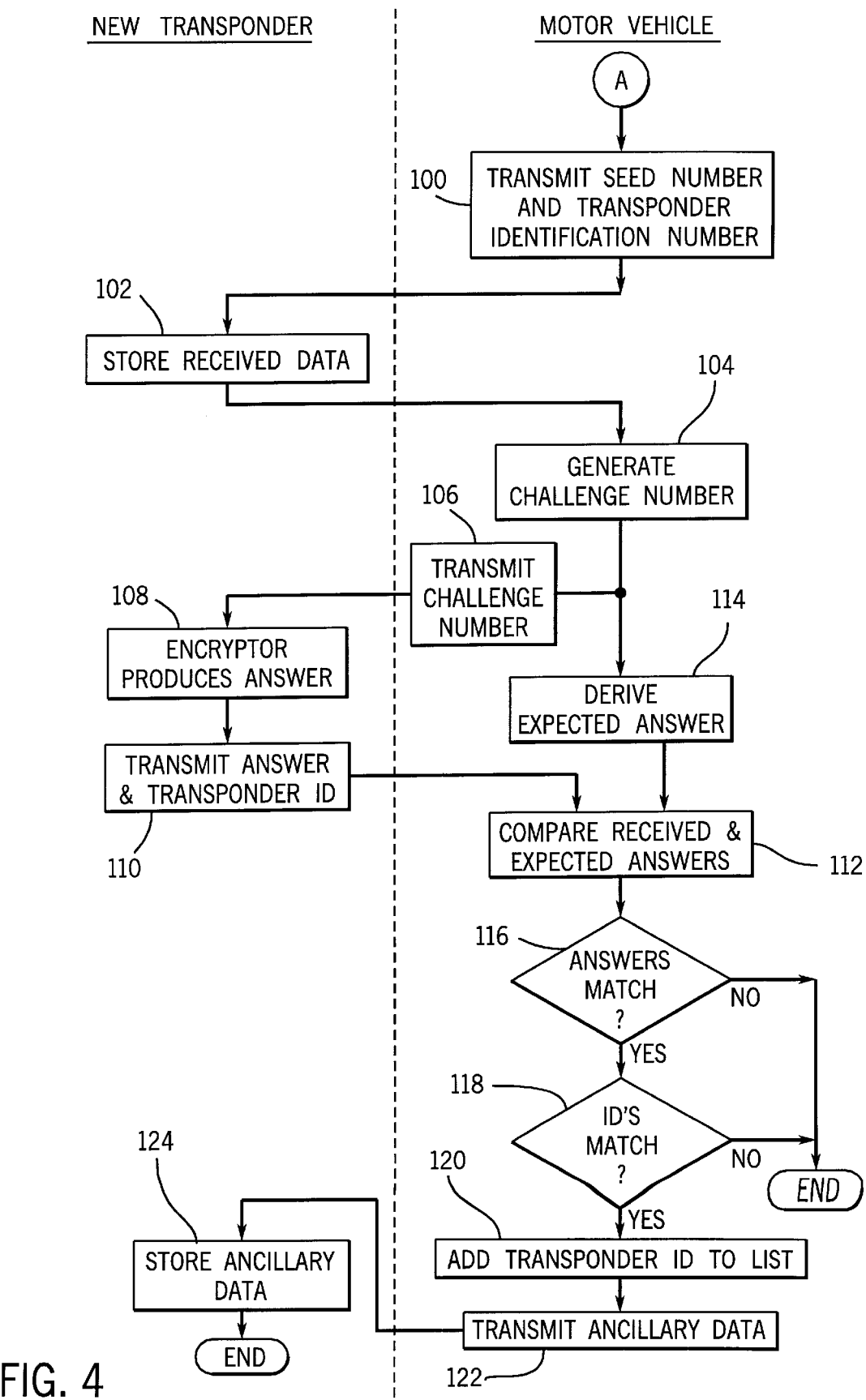
FIG. 4 is a flowchart of the procedure by which the keyless control system learns to recognize a new remote control.

With initial reference to FIG. 1, a keyless motor vehicle control system 10 comprises a remote control 12, which preferably has the form of a key ring fob carried by a driver, and a control circuit 14 located in the motor vehicle. The control circuit 14 includes a microcomputer 16 with an internal microprocessor and memory in which the control program and data are stored. A conventional clock circuit 22 supplies timing pulses to the microcomputer 16. A plurality of manual input switches 24 and 25 enable a service technician to place the microcomputer 16 into different operating modes, as will be described. The control circuit 14 operates several functions on the motor vehicle such as locking and unlocking the doors, unlatching the trunk lid and starting the engine, for example. For that functionality, the microcomputer 16 is interfaced to the corresponding actuating devices on the motor vehicle. In some motor vehicles, the various functions are controlled by an another computer in the motor vehicle to which the microcomputer 16 sends operating commands via a parallel communication bus 18, as will be described subsequently. In other motor vehicles, the microcomputer 16 has individual output lines 20 connected directly to the control devices for the respective functions being operated. Specifically, separate wires may be coupled to actuators which lock and unlock the doors, unlatch the trunk lid and start the engine.

A serial output line 26 and a serial input line 28 of the microcomputer 16 are connected to a first radio frequency transceiver 30. The first transceiver 30 modulates a standard RF frequency carrier with the serial data received on line 26 and transmits that modulated radio frequency signal via an antenna 32. The first transceiver 30 also demodulates other radio frequency signals received by the antenna 32 to recover serial digital data which then is sent via line 28 to the microcomputer 16.

The first transceiver 30 of the control circuit 14 is designed to communicate with a second radio frequency transceiver 40 and antenna 42 both located within the remote control 12. The second transceiver 40 has a receiver section which demodulates the received radio frequency signal to recover digital data that modulates that signal and the recovered data is sent in a serial format to an input register 44. The input register 44 converts the serial data stream from the second transceiver 40 into a parallel format which is read by a controller 46. The controller 46 may be either a hardwired device for sequentially performing the remote control operations to be described, or a programmable device which executes a software program to perform those operations. Controllers of this general type are well-known in different types of transponders and their conventional technology can be utilized to implement the functions of the present controller 46. The controller 46 of the remote control 12 is connected to an electrically erasable programmable read only memory (EEPROM) 48 which stores data to be transmitted to the motor vehicle control circuit 14 when the remote control is interrogated.

The remote control 12 also includes an encryptor 50 connected to the controller 46 to encrypt a remote control security number for transmission to the control circuit 14. The encryptor 50 utilizes a secret-key cryptography algorithm to encrypt data for sending to the control circuit. The algorithm specifies a sequence of a plurality of logical operations which are performed on a known seed number and a challenge number received from the control circuit to produce a number for transmission by the remote control. Several cryptography algorithms of this type are described by Mehrdad Foroozesh in an article entitled "Protecting Your Data With Cryptography," UNIX Review, November 1996, v14, n12, page 55(6), which description is incorporated herein by reference. Such encryption techniques and algorithms are commonly used to encrypt computer data being transmitted over common carriers.

A control circuit 14 also receives timing signals from a clock circuit 52. A plurality of user operable switches 54 are connected to different input lines to the controller 46 in order for the driver to select the specific functions to be performed on the motor vehicle. For example, a separate switch can be provided for the functions of unlocking and locking the doors, unlatching the trunk lid, and starting the engine.

Digital output data is sent by the control circuit in parallel form to a parallel-in/serial-out output register 56. The serial data from the output register 56 is applied to the input of a transmitter section in the second transceiver 40 which modulates a radio frequency signal which that data. The resultant RF signal is sent via the antenna 42 to the control circuit 14 in motor vehicle. The components of the remote control preferably are powered by a battery (not shown), but as an alternative, power could be derived from received RF signal energy as was done in some prior remote controls.

The procedure by which the keyless motor vehicle control system 10 operates different functions on the motor vehicle is depicted by the flowchart of FIG. 3. When activation of one of those functions is desired, at step 60 the driver presses the appropriate remote control switch 54 which corresponds to that function. This activation of the switch sends a signal to the controller 46 which responds by obtaining an initial numerical code from storage in the EEPROM 48. Preferably, although not required, the initial numerical code corresponds to the vehicle identification number (VIN) for the particular motor vehicle being controlled. Alternatively the initial numerical code may be a unique identification number assigned to that remote control and stored in the EEPROM 48. In either case, the initial numerical code is sent via output register 56 to the second transceiver 40 from which it is transmitted at step 62 to the control circuit 14 in the adjacent motor vehicle.

The RF remote control signal is received by a super heterodyne receiver section in the first transceiver 30. Receipt of the initial numerical code causes the motor vehicle control circuit 14, which had been in a "sleep state," to wake up at step 64 and its microcomputer 16 begins executing a software routine for interrogating the remote control 12. The process of waking up may verify that the remote control sent the proper initial code for this motor vehicle. In step 66 of the interrogation process, the microcomputer 16 generates a random number which preferably is at least four bytes long and which is referred to a "challenge number." This challenge number then is sent via line 26 to the first transceiver 30 where it is transmitted at step 68 to the remote control 12.

The remote control 12 receives the RF signal from the control circuit 14 via the antenna 42 and second transceiver 40 which recovers the challenge number from that signal. The challenge number is fed via the input register 44 to the controller 46. Upon receiving the challenge number, the controller 46 activates the encryptor 50 to generate an answer number. Specifically, the controller 46 sends the encryptor 50 the challenge number and a predefined secret seed number that is stored in the EEPROM 48. As graphically depicted in FIG. 2, the encryptor 50 performs a series of logical operations, denoted by ⊕, which combine the seed and challenge numbers according to the selected encryption algorithm utilized by the encryptor at step 70. As stated previously, the encryption algorithm may be any of several algorithms commonly used to encrypt computer data for transmission. The result is a four to five byte numerical answer which is in essence the challenge number encrypted by the seed number using the selected encryption algorithm. At step 72, the answer number then is sent by the controller 46 via the output register 56 to the second transceiver 40. The answer number then is transmitted via the radio frequency signal to the control circuit 14 on the motor vehicle.

The EEPROM 48 also stores a unique identification number (ID) for this remote control. If this identification number was not transmitted with the initial signal at step 62, the controller 46 now retrieves that identification number and causes it to be transmitted via the second transceiver 40. The identification number may be transmitted directly or first encrypted by the encryptor 50 using the cryptography algorithm and seed number, in which case the control circuit 14 is programmed to decrypt the received data. A plurality of remote controls 12 may be authorized to activate features of the same motor vehicle in much the same way as a number of different physical keys are able to open the doors. Although each of the authorized remote controls for the same motor vehicle has the same seed number stored in their EEPROM's 48, each remote control has a unique identification number. The controller 46 also causes a numerical indication of the particular switch 54 which was operated by the driver, and thus an indication of the function to be performed, to be transmitted at step 72.

The control circuit 14 in the motor vehicle receives the RF signal from the remote control 12 and the first transceiver 30 recovers the numerical answer, remote control identification number and switch indication which are stored temporarily within the memory of the microcomputer 16 at step 73. While the remote control 12 was encrypting the numerical answer and selecting the other items of data to be transmitted, the control circuit 14 at step 74 takes the challenge number produced at step 66 and applies the same encryption algorithm and seed number, as used by the encryptor 50 in the remote control 12, to produce an expected answer at step 74. This application of the encryption algorithm can be accomplished in software by the microcomputer 16, or a duplicate of the hardwired circuitry of the encryptor 50 can be incorporated in the control circuit 14 and operated under the microcomputer control to produce the expected answer. Since both the remote control 12 and the control circuit 14 utilize the same encryption algorithm, seed number and challenge number, the expected answer and the answer received from the remote control should be identical. Therefore, at step 76 the received and expected answers are compared and a determination is made at step 76 whether they exactly match each other. If the two answers do not match, as would occur if a bogus remote control 12 was employed in an attempt to access the motor vehicle, the execution of the program by the microcomputer 16 jumps to a point where the control circuit 14 return to the sleep mode without operating any of the motor vehicle functions.

However, if a determination is made at step 78 that the two answers match, the program execution by the microcomputer 16 advances to step 80 where the remote control identification number received by the control circuit 14 is compared to a list of valid remote control identification numbers stored within the microcomputer memory. This list contains the valid identification number for each remote control that is authorized to operate the motor vehicle. If the received remote control identification number is not on this list, the program execution jumps to the sleep mode. By requiring the validation of the remote control's unique identification number, a specific remote control that is lost can be rendered inoperative, as will be described, even though it produces the correct answer number in response to interrogation.

When a remote control identification number, received by the control circuit 14, matches one of the valid identification numbers contained with the microcomputer memory, the program execution advances to step 81. At this juncture the microcomputer 16 checks an input to determine whether a remote control delete mode switch 24 is closed. If that is not the case, the execution branches to step 82 at which the microcomputer 16 checks another input to determine whether a remote control add mode switch 25 is closed. The function of these switches 24 and 25 will be described subsequently.

When neither mode selection switch 24 or 25 is found to be closed the program execution advances to step 83 where the switch indication number received from the remote control 12 is evaluated to determine the indicated function to be performed by the motor vehicle. If the door unlock function has been indicated, the program execution branches to step 84 where a unlock command signal is sent out by the microcomputer 16 either over communication bus 18 to the main computer for the motor vehicle, or over one of the dedicated output lines 20 to the lock control circuit of the motor vehicle. Then, at step 86, the remote control identification number is sent by the microcomputer 16 over the communication bus 18 to another computer on the motor vehicle which automatically controls various adjustable devices, such as the driver's seat and rear view mirrors. In response, the other computer automatically moves those adjustable devices into positions previously stored for the driver who uses the remote control with this identification number. Thus the remote control identification number is utilized to personalize vehicle settings for the particular driver associated with the identified remote control.

Alternatively, when the switch indication decoded at step 83 indicates that the doors of the motor vehicle are to be locked, the program execution passes through step 88 where the appropriate output signals are produced by the microcomputer 16 to cause actuators in the doors to engage the locks. Similarly, step 90 is executed when the switch indication decoded at step 83 designates that the trunk is to be unlatched. Likewise, the operating procedure branches to step 92 when the switch indication designates that the engine is to be started. As with the other functions at this time, the microcomputer 16 would send the appropriate activation signals over communication bus 18 and the dedicated control lines 20 to cause the starting of the engine. Because the present keyless control system 10 provides a very high degree of security against unauthorized individuals being able to start the engine, the conventional key operated ignition switch with a mechanical interlock to the steering mechanism may be eliminated. It will be noted that a separate push button switch within the motor vehicle would be utilized to turn off the engine at a later point in time. After the particular functions have been activated, the control circuit then returns to the sleep mode until another signal is received from a remote control 12.

The present keyless vehicle activation system utilizes a rolling security code without requiring synchronized independent generation of the rolling code by both the remote control and the motor vehicle control circuit. A very large number of combinations can be implemented with a single combination assigned to a given motor vehicle, thus providing extremely high probability against unauthorized activation.

Ultimately, only a remote control may be employed to gain entry and start the motor vehicle without even the ability to use a physical key. In this eventuality, a provision must be made for an indication to be given to the driver when the battery within the remote control has been depleted to such a level where inoperability is approaching. One does not want the battery to become completely depleted and thereby depriving the driver of motor vehicle use. As a consequence, the remote control can be provided with a battery level detection circuit which senses when the battery voltage drops below a level which is slightly greater than the voltage level at which the remote control will no longer be functional. Upon that occurrence, a special numerical code is sent the next time the remote control 12 is utilized which provides an indication to the control circuit 14 that the remote control voltage has reached a dangerously low level. In response, the microcomputer 16 can send a signal to the main computer for the motor vehicle which generates a visual indication to the driver, such by illuminating the appropriate message on the instrument panel. This provides a warning to the driver the remote control needs battery replacement and affords a short period in which to replace the battery while the remote control still is usable. Since the remote control 12 stores the data in an EEPROM 48, the contents of the memory are not lost when the battery completely runs down or during battery replacement.

With reference to FIG. 1, because the remote control 12 has an EEPROM 48, additional storage locations can be provided for storage of ancillary information about the motor vehicle or the driver associated with the particular remote control. In this case, after activation of the designated function at steps 84–92 on the flowchart of FIG. 3, additional steps are executed in which the control circuit microcomputer 16 generates a command which is transmitted via the first transceiver 30 and antenna 32 to the remote control 12. This command orders the controller 46 in the remote control to obtain one or more items of ancillary information from the EEPROM 48 and transmit it back to the control circuit 14. Thus the control circuit 14 is able to obtain information about the driver's identity, past vehicle performance, etc. which has been stored in the remote control memory.

With this additional remote control functionality, the microcomputer 16 is able to update the ancillary information stored in the remote control 12. To do so the control circuit 14 transmits the updated information along with a storage command. The controller 46 of the remote control 12 responds to the storage command by storing the accompanying updated information in designated locations within the EEPROM 48.

The information stored within the remote control 12 also may be read out and altered by special devices at the motor vehicle dealers which are similar to the structure of the control circuit 14 in FIG. 1. However, that device is not associated with a motor vehicle and contains additional components for displaying information read from the remote control and entering information to be stored in the remote control. In such a device, a video monitor, printer and an alphanumeric keyboard are connected to the microcomputer 16 which is also programmed with the appropriate software for implementing the data read and write operations. Similar remote control readout devices could be provided to law enforcement agencies in order to determine the identity of the driver who normally utilizes the remote control, and to medical personnel to obtain medical information, such as blood type, allergies and current medications, about the driver from the remote control.

In the event that the driver loses one of the authorized remote controls for a given motor vehicle, the corresponding remote control identification number can be removed from the list of authorized remote controls contained within the memory of the vehicle control circuit microcomputer 16. As a result should a finder or thief of the missing remote control be able to match it with the particular vehicle, the remote control no longer will be able to function properly.

To delete a remote control identification number from the microcomputer memory list as would be desirable when a remote control is lost or stolen, a motor vehicle dealer accesses the control circuit 14 and closes the deletion mode switch 24. While that switch is closed, each of the remaining remote controls is placed one at a time near the vehicle and one of its function switches 54 is pressed. This operation sequentially sends the remote control identification number from each of the remaining remote controls to the control circuit 14 in the motor vehicle. Each time a remote control is activated, the operating procedure branches from step 81 in FIG. 3 to a delete mode routine which causes microcomputer 16 to store each of the received remote control identification numbers. After all of the remaining remote controls have been activated, the motor vehicle dealer opens the deletion mode switch 24 which causes the microcomputer 16 to scan its previous list of remote control identification numbers to determine which ones were not received while the deletion mode switch 24 was closed. The non-received remote control identification numbers are deleted from the microcomputer memory so that the corresponding remote controls no longer are able to operate the motor vehicle.

Another mode of operation can be activated to add additional remote control identification numbers to the list of authorized remote controls within the memory of the microcomputer 16. This process is analogous to duplicating the physical keys previously used to access motor vehicles and is initiated by a motor vehicle dealer closing the remote control add mode switch 25 within the control circuit 14. Then, one of the existing authorized remote controls is activated by pressing any one of the function switches 54. This operation results in the execution of steps 60 through 82 in FIG. 3 at the end of which a determination is made at step 82 that the remote control add mode switch 25 is closed and the procedure branches to the remote control add routine depicted on FIG. 4.

The remote control add routine at step 100 causes control circuit 14 to send the secret seed number utilized by the encryption algorithm and a previously unassigned remote control identification number to the first transceiver 30 along with a command instructing a new remote control to store those transmitted numbers. Any previously programmed remote control within the vicinity of the motor vehicle is inhibited from responding to this command so that the information contained within the previously programmed remote control will not be overwritten by the new data being transmitted by the control circuit 14.

When an unprogrammed or erased remote control 12 receives this data stream from the control circuit 14 at procedure step 102, the controller 46 recognizes the command as indicating programming of the remote control. In response the seed number from the control circuit is stored into the designated location within EEPROM 48 and the identification number is placed into another designated location within that memory. Thus the new remote control is programmed with the appropriate seed number for activating the particular motor vehicle and a unique remote control identification number which will be recognized by that motor vehicle.

Then the microcomputer 16 within the control circuit randomly generates a challenge number at step 104 which is transmitted to the newly programmed remote control at step 106. The received challenge number is passed to the remote control's encryptor 50 which uses the challenge number and the previously stored seed number to produce a numerical answer at step 108. At step 110 that numerical answer is transmitted back to the control circuit 14, along with the newly stored remote control identification number.

Upon receipt of the numerical answer and remote control identification number, at step 112 the control circuit 14 compares the received answer with an expected answer generated at step 114 to verify that the new remote control has been programmed properly. If the answers do not match at step 116, the procedure terminates without adding a new entry to the list of authorized remote controls. The remote control identification number received by the control circuit 14 also is verified for its accuracy at step 118. If the new remote control passes both these verification tests, at step 120 the microcomputer 16 adds the new remote control identification number to the list of authorized remote controls that is maintained in the microcomputer memory.

Then at step 122, the control circuit 14 transmits an storage command and ancillary information which is to be stored in the new remote control. The remote control responds at step 124 by storing the ancillary information within its EEPROM 48 and the remote control addition procedure terminates.

With reference again to FIG. 1, the embodiment of the keyless motor vehicle control system 10 described above requires that the user manually activate one of the switches 53 on the remote control 12. As an alternative, the switches may be replaced with a motion detector, such as a ball in a cage type switch. Thus whenever the driver is walking or handling the remote control 12, the motion detector indicates that motion to the controller 46. In response, the controller 46 causes the remote control 12 to transmit the initial numerical code. Then the remote control 12 listens for the control circuit 14 to transmit the challenge number. If a challenge number is not received within a defined period of time after transmission of the initial numerical code, the remote control 12 ceases operating until another signal from the motion detector is produced. However, when the remote control 12 receives a challenge number, the encryptor 50 is activated to produce an answer which is sent to the control circuit 14 and the process proceeds as described previously.

A further embodiment also is feasible in which the remote control is passive. In this situation, the control circuit 14 periodically transmits an RF activation signal, which upon receipt causes remote control 12 to respond automatically by transmitting the initial numerical code. In response to the initial numerical code, the control circuit 14 sends the challenge number and waits for the answer. When the control circuit 14 verifies the receipt of a correct answer and identification data from an authorized remote control 12, signals are sent to components in the motor vehicle which unlock at least one door and enable a manual switch on the dashboard to be pressed to start the engine. In this embodiment, the periodically transmitted signal from the control circuit activates remote control to commence the operating procedure of FIG. 3, rather than the driver pressing a remote control switch 54. Therefore, the driver merely has to be within the transmission range of the motor vehicle control circuit 14. In this embodiment, after the engine is turned off manually, the control circuit 14 is disabled for a given period of time allowing the driver to move outside the transmission range before the control circuit again commences the periodic transmission of the activation signal.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

We claim:

1. A method for operating a keyless motor vehicle control system including a remote control for carrying by a user and a control circuit in the motor vehicle, said method comprising the steps of:

storing seed data in the control circuit;

storing the seed data in the remote control;

programming a first remote control identification into the remote control;

storing the first remote control identification into the control circuit;

in response to activation of the remote control by movement of the user, exchanging challenge data between the control circuit and the remote control;

the control circuit executing an encryption algorithm which uses the seed data and the challenge data to produce a first answer;

the remote control executing the encryption algorithm which uses the seed data and the challenge data to produce a second answer;

the remote control transmitting the second answer to the control circuit;

the control circuit comparing the first and second answers and producing a first indication when a match occurs;

the remote control transmitting the first remote control identification to the control circuit;

determining whether the first remote control identification received from the remote control matches a first remote control identification previously stored in the control circuit and if so producing a second indication; and in response to presence of both the first and second indications, activating a component of the motor vehicle to perform a defined function.

2. The method as recited in claim 1 further comprising the control circuit randomly generating the challenge number.

3. The method as recited in claim 1 wherein the defined function is selected from a group consisting of unlocking a door, locking a door, unlatching a trunk lid, and starting an engine.

4. The method recited in claim 1 further comprises the user defining a function on the remote control; and transmitting to the control circuit a designation of the function defined by the user.

5. The method as recited in claim 1 wherein the steps of the control circuit and the remote control executing an encryption algorithm comprise performing a plurality of logical operations on the seed data and the challenge data.

6. The method as recited in claim 1 wherein the step of storing the seed data in the remote control comprises:

(a) exchanging a challenge number between the control circuit and a previously programmed remote control;

(b) the control circuit executing the encryption algorithm which uses the seed data and the challenge number to produce a third answer;

(c) the previously programmed remote control executing the encryption algorithm which uses the seed data and the challenge number to produce a fourth answer;

(d) the previously programmed remote control transmitting the fourth answer and a second remote control identification to the control circuit;

(e) the control circuit comparing the third and fourth answers and producing a third indication when a match occurs;

(f) determining whether the second remote control identification received from the previously programmed remote control matches a remote control identification previously stored in the control circuit and if so producing a fourth indication;

(g) upon the occurrence of both the third and fourth indications, the control circuit transmitting the seed data to the remote control; and (h) the remote control storing the seed data.

7. The method as recited in claim 6 wherein the step of programming a first remote control identification into the remote control comprises upon the occurrence of both the first and second indications, the control circuit transmitting the first remote control identification to the remote control; and the remote control storing the first remote control identification.

8. The method as recited in claim 7 further comprising the control circuit verifying that the seed data and the first remote control identification were properly stored by the remote control.

9. The method as recited in claim 6 further comprising the control circuit verifying that the seed data was properly stored by the remote control.

10. The method as recited in claim 6 further comprising the remote control transmitting the first remote control identification to the control circuit; and the storing the first remote control identification into the control circuit.

11. The method as recited in claim 6 further comprising deleting the first remote control identification from storage in the control circuit.

12. A method for remotely operating locks of a motor vehicle with a keyless entry system that includes a control circuit in the motor vehicle and a remote control for carrying by a user, said method comprising the steps of:

storing identical seed data in both the control circuit and the remote control;

in response to the user activating the remote control, generating and exchanging challenge data between the control circuit and the remote control;

the control circuit executing an encryption algorithm which uses the seed data and the challenge data to produce a first answer;

the remote control executing the encryption algorithm which uses the seed data and the challenge data to produce a second answer;

the remote control transmitting the second answer to the control circuit;

the control circuit comparing the first and second answers and producing a first indication when a match occurs; and in response to the first indication, unlocking a door on the motor vehicle.

13. The method recited in claim 12 further comprising:

programming a remote control identification into the remote control;

storing the remote control identification into the control circuit;

when the user activates the remote control, the remote control transmitting the remote control identification to the control circuit;

the control circuit determining whether the remote control identification received from the remote control matches a remote control identification previously stored in the control circuit and if so producing a second indication; and wherein the step of unlocking a door on the motor vehicle also is in response to the second indication.

14. A method for remotely operating a motor vehicle with a keyless control system that includes a control circuit in the motor vehicle and a remote control for carrying by a user, said method comprising the steps of:

the control circuit transmitting an interrogation signal;

in response to receiving the interrogation signal, the remote control transmitting an initial signal;

the control circuit responding to the initial signal by transmitting challenge data to the remote control;

the control circuit executing an encryption algorithm which uses seed data and the challenge data to produce a first answer;

the remote control executing the encryption algorithm which uses the seed data and the challenge data to produce a second answer;

the remote control transmitting the second answer to the control circuit;

the control circuit comparing the first and second answers and producing a first indication when a match occurs; and in response to the first indication, performing a function on the motor vehicle.

15. The method recited in claim 12 further comprising:

storing information regarding the at least one of the motor vehicle operation history and the driver;

the control circuit sending a command to the remote control in response to the first indication;

the remote control transmitting the information in response to receiving the command; and the control circuit receiving the information.

16. A method for operating a keyless motor vehicle control system including a portable remote control on which a user selects a function for the motor vehicle to perform, and including a control circuit in the motor vehicle, said method comprising the steps of:

storing seed data in the control circuit;

storing the seed data in the portable remote control;

programming a remote control identification into the portable remote control;

storing the remote control identification into the control circuit; thereafter in response to a user selecting a function on the portable remote control, transmitting an initial signal to the control circuit;

the control circuit responding to receiving the initial signal by generating challenge data and transmitting the challenge data to the portable remote control;

the control circuit executing an encryption algorithm which uses the seed data and the challenge data to produce a first answer;

the portable remote control executing the encryption algorithm which uses the seed data and the challenge data to produce a second answer;

the portable remote control transmitting the second answer and the remote control identification to the control circuit;

the control circuit comparing the first and second answers and producing a first indication when a match occurs;

determining whether the remote control identification received from the portable remote control matches a remote control identification previously stored in the control circuit and if so producing a second indication; and in response to presence of both the first and second indications, producing a control signal for activating the function selected by the user.

17. The method recited in claim 16 wherein the user selects the function to be performed from a group consisting of unlocking a door, locking a door, unlatching a trunk lid, and starting an engine.

18. The method recited in claim 16 further comprising the remote control transmitting to the control circuit a designation of the function selected by the user.

19. The method recited in claim 16 wherein the function selected by the user is starting the engine; and further comprising responding to the control signal by starting the engine without requiring use of a key.

* * * * *